April 25, 1961 A. J. CLARK 2,981,021

TELEPHONE ATTACHMENT

Filed June 1, 1959

INVENTOR.
ASHFORD JAMES CLARK,

BY George A. Maxwell
AGENT.

United States Patent Office 2,981,021

Patented Apr. 25, 1961

2,981,021

TELEPHONE ATTACHMENT

Ashford James Clark, 11419 Hemlock St., El Monte, Calif.

Filed June 1, 1959, Ser. No. 817,288

5 Claims. (Cl. 40—336)

This invention has to do with an attachment for a telephone and is more particularly concerned with an attachment applicable to a desk-type telephone receiver and serviceable to carry and support an index book, or the like.

In many situations where telephones are used, little or no extra or convenient space is available to keep an index book or scratch pad. As a result, when the person or persons using the telephone find need to refer to the index book for a telephone number, or find need of a scratch pad, they must search through materials surrounding and about the telephone, or through nearby drawers and the like, where these items might be kept.

Attempts have been made to provide suitable attachments applicable to telephones for supporting and carrying such items and so that they might always be immediately available or accessible for use. Such attempts have, however, met with limited success due to the fact that telephone companies, who own and effectively control the use of telephones, prohibit the application of devices on telephones which require the drilling of holes, or the application of clamps and the like, which would or might adversely affect the structural or electrical characteristics of the instrument. As a result of the restrictions established by the telephone companies, attachments for telephones have been rather ineffective or have been so complicated and costly to manufacture that they are not practical.

An object of the present invention is to provide an attachment for a desk type telephone receiver instrument which does not require the drilling of holes in, or the application of screw fasteners, clamps, or the like, to the instrument.

A further object of the present invention is to provide an attachment adapted to carry an index book, scratch pad, or the like, which attachment is related to and cooperatively engages elements and/or portions of ordinary disc-type telephone receiver sets, such as are presently in use.

It is an object of the present invention to provide an attachment of the character referred to which is such that it can be formed of a single length of wire, or a single piece of sheet material and such that it can be easily and conveniently formed without the necessity of providing and employing costly and complicated dies, forms, machinery and the like.

Still further, it is an object of my invention to provide an attachment of the character referred to which is such that it will support and maintain an index book, scratch pad, or other similar or desired article in a most convenient relationship to the instrument.

Another object is to provide an attachment of the character referred to which occupies a minimum of space and an attachment which can be easily and quickly removed from the instrument to which it is related and conveniently stored.

The various objects and features of my invention will be fully understood from the following detailed description of typical preferred forms and applications of my invention, throughout which description reference is made to the accompanying drawings, in which.

Figure 1:
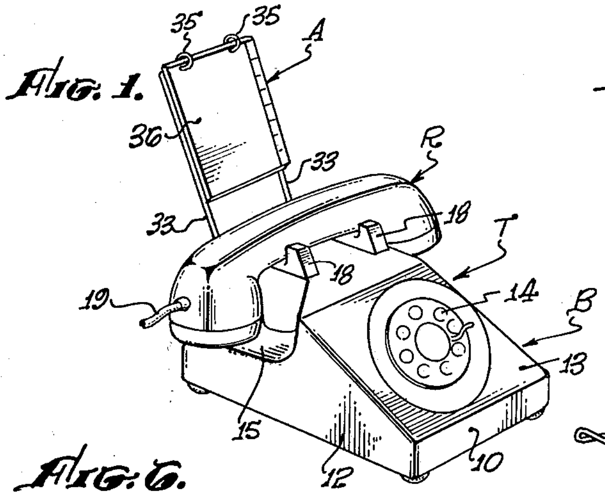
Fig. 1 is a perspective view of a telephone receiver instrument or set with the attachment provided by the present invention related thereto.
Figure 5:
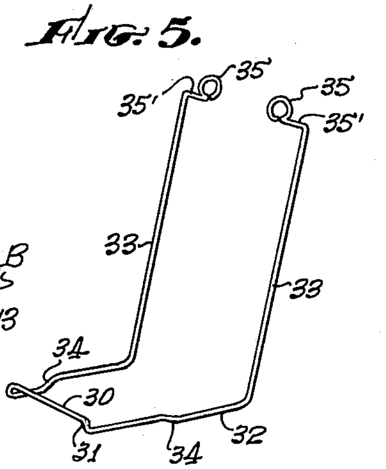
Fig. 5 is a perspective view of a portion of my new construction.

The attachment A provided by the present invention is adapted to be related to a conventional or standard desk type telephone set or instrument T, in the manner illustrated throughout the accompanying drawings. The conventional or standard telephone instrument T of the type herein concerned with and illustrated in the drawings involves a substantially rectangular base B having vertically disposed front, rear and side walls 10, 11 and 12, a top wall having a forwardly and downwardly inclined front section 13 on which a dial 14 is mounted and a rearwardly and downwardly inclined rear section 15. The rear section 15 of the top of the base occurs in a plane spaced below the front section 13, or is of lesser incline than the front section and so that the forward end of the rear section extends forwardly and below the rear edge 16 of the front section and defines an elongate, reawardly opening, finger receiving socket 17. The socket 17 extends transversely of the base and is closed at its ends by a pair of laterally spaced, upwardly projecting saddles 18, which saddles are adapted to normally receive and support a movable receiver element R of the instrument. The receiver element R carries the ear piece and mouth piece of the instrument and is connected with the base B by a suitable card 19.

Figures 3, 4:
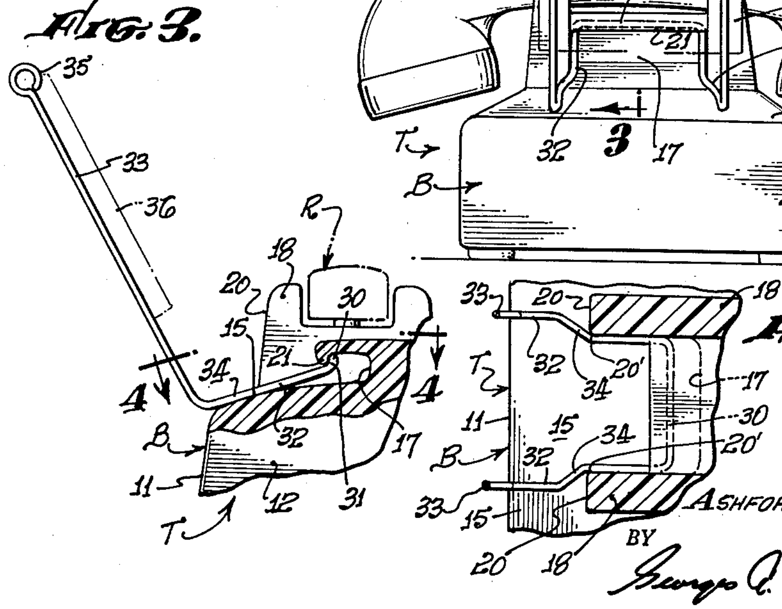
Fig. 3 is a transverse sectional view taken as indicated by line 3—3 on Fig. 2.
Fig. 4 is a sectional view taken as indicated by line 4—4 on Fig. 3.

The saddles 18 on the base B are elongate block-like members and extend longitudinally of the base. The saddles normally extend a short distance rearwardly of the socket 17 and having a substantially vertically disposed rear end 20, as clearly illustrated in Figs. 3 and 4 of the drawings.

The rear edge of the front section 13 of the top of the base is provided with a downwardly projecting lip 21, which lip is adapted to engage the fingers and prevent the instrument from sliding from the fingers when the instrument is being carried.

Several models of desk type telephone instruments are presently in use. These several models of instruments vary slightly in appearance, by each involving the several characteristics and features set forth above.

The attachment A that I provide and which is illustrated in Figs. 1 through 5 of the drawings is a simple, unitary element formed of a length of work. The attachment A involves a horizontally disposed front portion 30 having downwardly turned ends 31 corresponding in lateral extent with the socket 17 of the instrument T and adapted to engage the under side of the front section 13 of the instrument top immediately forward of the lip 21, elongate, intermediate portions 32 projecting rearwardly from the ends 31 of the front portion 30 and adapted to bear and rest on the rear section 15 of the top of the instrument base B and elongate rear portions 33 projecting rearwardly and upwardly from the rear ends of the intermediate portions 32 and adapted to support and carry a suitable article or articles.

In the preferred carrying out of the invention and as illustrated throughout the drawings, the intermediate portions 32 are laterally offset intermediate their ends to establish laterally outwardly projecting, substantially forwardly disposed shoulders 34, which shoulders are adapted to engage the rear end 20 of the saddles 18, or the inner rear corners 20' of the saddles, as clearly illustrated in the drawings.

In the form of the invention under consideration, the rear portions 33 are provided with suitable mounting means 35 at their upper terminal ends, which means are shown as involving simple loops formed integrally thereon. The loops are shown engaged through openings in an index book 36. The loops 35 serve to bind the pages of the book 36 together and allow for free turning of the pages as circumstances require.

In practice, and due to the lateral spacing and inclination of the portions 33, the book 36 is normally firmly supported in a forwardly and upwardly inclined position for easy and convenient use. When the pages of the book are turned over they hang freely at the rear side of the portions 33 and in such a manner that they can be easily engaged for convenient closing of the book.

In the case illustrated, the loops 35 are established to project forwardly from the plane of the rear portions 33 and curvedly extend upwardly, rearwardly and downwardly.

In practice, and as illustrated, the upper portions 33 can be turned laterally inwardly as at 35' so as to establish stop shoulders for a book 36, the lateral extent of which is less than that of the portions 33.

In operation, the forward portion 30 of the attachment is entered into the socket 17 of the instrument T to engage the top wall therein, which wall is established by the front top section of the top of the instrument base B, and hooks behind the lip 21. The intermediate portions 32 of the attachment rest on the rear section 15 of the top of the instrument T. The rear portion 33 of the attachment and the book 36, or other article carried thereby, cause the attachment to tip or pivot on the section 15 of the base and thereby maintain the front portion up and in hooked relationship with the lip 21.

The shoulders 34 on the intermediate portions 32 and engaging the saddles 18 of the instrument serve to prevent the attachment from shifting relative to the instrument and also serve to maintain the front portion 30 in the uniform bearing engagement along the front side of the lip 21.

In practice, if or when it is desired to remove the attachment A from the instrument T, it is only necessary to pivot the rear portion thereof forwardly to disengage the front portion from hooked engagement with the lip 21 and then bodily shift the attachment rearwardly.

While I have shown the mounting means 35 as involving loops and as supporting an index book 36, it will be apparent that other types or kinds of mounting means could be provided and could be employed to engage and carry or support any article or device which one might wish to attach to the instrument T.

Figure 6:
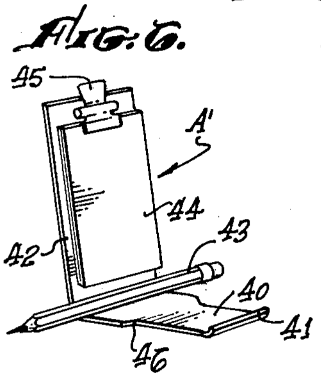
Fig. 6 is a perspective view of a modified form of the invention.
Figure 2:
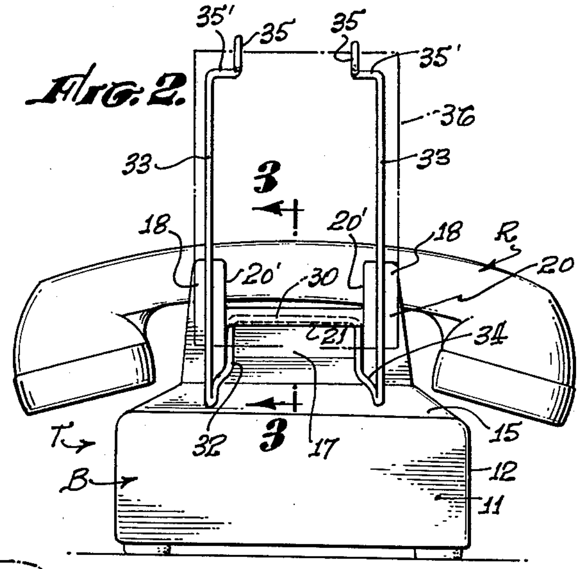
Fig. 2 is a back elevational view of the structure shown in Fig. 1 of the drawings.

In the form of the invention illustrated in Fig. 6 of the drawings, the attachment A' is shown as being established from a piece of sheet metal, or the like.

The attachment A' involves a flat, substantially rectangular, intermediate portion 40 having front, rear and side edges and adapted to rest and bear on the section 15 of the top of an instrument T, an upwardly turned front portion 41 along the front edge of the intermediate portion 41 and adapted to project into the socket 17 of the instrument and establish hooked engagement with the lip 21 in the socket and a plane rectangular rear portion 42 projecting rearwardly and upwardly from the rear edge of the intermediate portion and adapted to support and carry articles such as a pencil 43 and a scratch pad 44, or the like.

As shown, the rear portion 42 can be provided with a suitable mounting means, such as a clamp 45 for carrying the scratch pad, or the like. The clamp 45 is shown as a simple, manually operated, spring actuated clamp and is secured to the upper end of the portion 42 to occur at and oppose the forwardly disposed surface thereof.

The side edges of the intermediate portion 40 are provided with substantially, forwardly projecting shoulders 46 to engage the rear ends 20 of the instrument saddles 18.

It will be apparent that this second form of the present invention cooperates with the instrument T in exactly the same way or manner as the first form of the invention.

From the foregoing, it will be apparent that I have invented a telephone attachment which is extremely simple and inexpensive to manufacture and an attachment which is both highly effective and dependable in operation.

Having described only typical preferred forms and applications of my invention, I do not wish to be limited or restricted to the specific details herein set forth, but wish to reserve to myself any modifications or variations that may appear to those skilled in the art and fall within the scope of the following claims:

Having described my invention, I claim:

1. An attachment applicable to the base of a telephone receiver set having a top with a downwardly inclined rear section and a rearwardly opening finger receiving socket with a top wall having a downwardly projecting lip extending transversely thereof at the forward end of the said rear section including, a unitary element formed of a length of wire having a transverse front portion to extend into the socket and establish hooked engagement with the lip therein, a pair of intermediate portions projecting rearwardly from the ends of the front portion and engaging said rear section and rear sections projecting rearwardly and upwardly from the intermediate portions.

2. An attachment applicable to the base of a telephone receiver set having a top with a downwardly inclined rear section and a rearwardly opening finger receiving socket with a top wall having a downwardly projecting lip extending transversely thereof at the forward end of said rear section including, a unitary element formed of a length of wire having a transverse front portion to extend into the socket and establish hooked engagement with the lip therein, a pair of intermediate portions projecting rearwardly from the ends of the front portion and engaging said rear section and rear sections projecting rearwardly and upwardly from the intermediate portions, said rear portions having mounting means adapted to engage an article to be carried by said attachment.

3. An attachment applicable to the base of a telephone receiver set having a top with a downwardly inclined rear section and a rearwardly opening finger receiving socket with a top wall having a downwardly projecting lip extending transversely thereof at the forward end of the said rear section including, a unitary element formed of a length of wire having a transverse front portion to extend into the socket and establish hooked engagement with the lip therein, a pair of intermediate portions projecting rearwardly from the ends of the front portion and engaging said rear section and rear sections projecting rearwardly and upwardly from the intermediate portions, said rear portions having loops at their upper rear ends and engaged through openings in an index book to pivotally support and carry the book.

4. An attachment applicable to the base of a telephone receiver set having a top with a downwardly inclined rear section, a rearwardly opening finger receiving socket with a top wall having a downwardly projecting lip extending transversely thereof at the forward end of said rear section and laterally spaced saddles with rear ends projecting upwardly from the base at the ends of the socket including, a unitary element formed of a length of wire having a transverse front portion to extend into the socket and establish hooked engagement with the lip therein, a pair of intermediate portions projecting rearwardly from the ends of the front portion to engage said rear section and being offset intermediate their ends to establish forwardly disposed shoulders to engage the rear end of the saddles and rear sections projecting upwardly and rearwardly from the intermediate portions, said rear portions having mounting means adapted to engage an article to be carried by said attachment.

5. An attachment applicable to the base of a telephone receiver set having a top with a downwardly inclined rear section, a rearwardly opening finger receiving socket with a top wall having a downwardly projecting lip extending transversely thereof at the forward end of said rear section and laterally spaced saddles with rear ends projecting upwardly from the base at the ends of the socket including, a unitary element formed of a length of wire having a transverse front portion to extend into the socket and establish hooked engagement with the lip therein, a pair of intermediate portions projecting rearwardly from the ends of the front portion to engage said rear section and being offset intermediate their ends to establish forwardly disposed shoulders to engage the rear end of the saddles and rear sections projecting upwardly and rearwardly from the intermediate portions, said rear portions having loops at their upper rear ends and engaged through openings in an index book to pivotally support and carry the book.

References Cited in the file of this patent

UNITED STATES PATENTS 2,795,877 Falk ------------------- June 18, 1957

FOREIGN PATENTS 1,031,012 France ---------------- Mar. 18, 1953